(12) United States Patent
Teskey et al.

(10) Patent No.: US 12,242,798 B2
(45) Date of Patent: *Mar. 4, 2025

(54) SYSTEM AND METHODS FOR CONTEXT SPECIFIC ANNOTATION OF ELECTRONIC FILES

(71) Applicant: D2L Corporation, Kitchener (CA)

(72) Inventors: Matthew Robert Teskey, New Hamburg (CA); Kenneth James Chapman, Kitchener (CA); Jeremy Jason Auger, Breslau (CA); Brian John Cepuran, Oakville (CA)

(73) Assignee: D2L Corporation, Kitchener (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/442,443

(22) Filed: Feb. 15, 2024

(65) Prior Publication Data

US 2024/0311552 A1    Sep. 19, 2024

Related U.S. Application Data

(63) Continuation of application No. 17/716,462, filed on Apr. 8, 2022, now Pat. No. 11,934,770, which is a continuation of application No. 15/337,782, filed on Oct. 28, 2016, now Pat. No. 11,314,929, which is a continuation of application No. 13/269,164, filed on Oct. 7, 2011, now Pat. No. 9,483,454.

(51) Int. Cl.
| | |
|---|---|
| G06F 40/169 | (2020.01) |
| G06Q 10/10 | (2023.01) |
| G09B 7/00 | (2006.01) |
| H04L 67/02 | (2022.01) |

(52) U.S. Cl.
CPC .......... *G06F 40/169* (2020.01); *G06Q 10/10* (2013.01); *G09B 7/00* (2013.01); *H04L 67/02* (2013.01)

(58) Field of Classification Search
CPC ........ G06F 40/169; G06Q 10/10; G09B 7/00; H04L 67/02
See application file for complete search history.

(56) References Cited

U.S. PATENT DOCUMENTS

| | | |
|---|---|---|
| 6,484,156 B1 | 11/2002 | Gupta et al. |
| 6,687,876 B1 | 2/2004 | Schilit et al. |
| 6,687,878 B1 | 2/2004 | Eintracht et al. |
| 6,721,921 B1 | 4/2004 | Altman |
| 7,089,278 B1 | 8/2006 | Churchill |
| 7,149,776 B1 | 12/2006 | Roy et al. |
| 7,194,679 B1 | 3/2007 | Green |
| 7,209,948 B2 | 4/2007 | Srinivasa |
| 7,299,407 B2 | 11/2007 | Joshi et al. |

(Continued)

*Primary Examiner* — Blake J Rubin
(74) *Attorney, Agent, or Firm* — SMART & BIGGAR LP; Jason B. Hynes; David Morrison (57) ABSTRACT

Embodiments described herein are directed to an annotation system having a remote processor, and a client processor in data communication with the remote processor. The client processor is adapted to send a first request for an electronic file to the remote processor, receive the electronic file from the remote processor, define at least one new annotation about the electronic file, and define at least one anchor associated with the at least one annotation. The at least one of the remote processor and the client processor is adapted to store the at least one anchor and the at least one annotation in an annotation file that is separate from the electronic file.

19 Claims, 6 Drawing Sheets

(56) References Cited

U.S. PATENT DOCUMENTS

| | | |
|---|---|---|
| 7,370,269 B1 | 5/2008 | Prabhu |
| 7,418,656 B1 | 8/2008 | Petersen |
| 7,743,026 B2 | 6/2010 | Saliba et al. |
| 7,797,630 B2 | 9/2010 | Kashi |
| 7,954,049 B2 | 5/2011 | Fletcher et al. |
| 8,069,194 B1 | 11/2011 | Manber et al. |
| 8,122,341 B1 | 2/2012 | Dayan et al. |
| 8,387,006 B1 | 2/2013 | Taylor |
| 8,484,561 B1 | 7/2013 | Lemonik et al. |
| 8,640,023 B1 | 1/2014 | Murray |
| 8,677,259 B2 | 3/2014 | Flemings et al. |
| 8,806,320 B1 | 8/2014 | Abdo |
| 9,396,279 B1 | 7/2016 | O'Donnell |
| 2002/0059343 A1 | 5/2002 | Kurishima et al. |
| 2002/0059373 A1 | 5/2002 | Boys |
| 2002/0078088 A1 | 6/2002 | Kuruoglu et al. |
| 2003/0117379 A1 | 6/2003 | Carro |
| 2004/0205575 A1 | 10/2004 | Bargeron et al. |
| 2004/0216032 A1 | 10/2004 | Amitay et al. |
| 2004/0252888 A1 | 12/2004 | Bargeron et al. |
| 2005/0081159 A1 | 4/2005 | Gupta et al. |
| 2005/0132281 A1 | 7/2005 | Pan et al. |
| 2005/0160356 A1 | 7/2005 | Albornoz et al. |
| 2005/0160357 A1 | 7/2005 | Rivette et al. |
| 2005/0166138 A1 | 7/2005 | Kundu |
| 2005/0183005 A1 | 8/2005 | Denoue et al. |
| 2005/0289452 A1 | 12/2005 | Kashi et al. |
| 2006/0031755 A1 | 2/2006 | Kashi |
| 2006/0053364 A1 | 3/2006 | Hollander et al. |
| 2006/0265640 A1 | 11/2006 | Albornoz et al. |
| 2006/0282762 A1 | 12/2006 | Diamond et al. |
| 2006/0291727 A1 | 12/2006 | Bargeron |
| 2007/0044017 A1 | 2/2007 | Zhu et al. |
| 2007/0055926 A1 | 3/2007 | Christiansen et al. |
| 2007/0061704 A1 | 3/2007 | Simova et al. |
| 2007/0174762 A1 | 7/2007 | Plant |
| 2007/0258100 A1 | 11/2007 | Kano |
| 2008/0133584 A1 | 6/2008 | Nishino et al. |
| 2008/0155060 A1 | 6/2008 | Weber et al. |
| 2008/0201651 A1 | 8/2008 | Hong et al. |
| 2008/0244740 A1 | 10/2008 | Hicks et al. |
| 2008/0301228 A1 | 12/2008 | Flavin |
| 2009/0007003 A1 | 1/2009 | Dukhon et al. |
| 2009/0125542 A1 | 5/2009 | Loes et al. |
| 2009/0199083 A1 | 8/2009 | Sar et al. |
| 2009/0254867 A1 | 10/2009 | Farouk et al. |
| 2009/0281970 A1 | 11/2009 | Mika et al. |
| 2009/0307762 A1 | 12/2009 | Cudd, Jr. |
| 2009/0327855 A1 | 12/2009 | Le |
| 2010/0011282 A1 | 1/2010 | Dollard et al. |
| 2010/0095198 A1 | 4/2010 | Bultrowicz et al. |
| 2010/0257451 A1 | 10/2010 | Halevi |
| 2010/0257457 A1 | 10/2010 | De Goes |
| 2010/0027845 A1 | 11/2010 | King |
| 2011/0066957 A1 | 3/2011 | Prats et al. |
| 2011/0145692 A1 | 6/2011 | Noyes et al. |
| 2011/0295851 A1 | 12/2011 | El-Saban et al. |
| 2012/0030553 A1 | 2/2012 | Delpha et al. |
| 2012/0110445 A1 | 5/2012 | Greenspan et al. |
| 2012/0110472 A1 | 5/2012 | Amrhein et al. |
| 2012/0210243 A1 | 8/2012 | Uhma et al. |
| 2012/0284606 A1 | 11/2012 | Satrick et al. |
| 2012/0297182 A1 | 11/2012 | Hawkins |
| 2013/0031455 A1 | 1/2013 | Griffiths et al. |
| 2013/0031457 A1 | 1/2013 | Griffiths et al. |
| 2013/0080871 A1 | 3/2013 | Howarth et al. |
| 2015/0024351 A1 | 1/2015 | Landwehr |

SYSTEM AND METHODS FOR CONTEXT SPECIFIC ANNOTATION OF ELECTRONIC FILES

CROSS-REFERENCE TO RELATED PATENT APPLICATIONS

This application is a continuation of U.S. patent application Ser. No. 17/716,462, filed on Apr. 8, 2022, which is a continuation of U.S. patent application Ser. No. 15/337,782, filed on Oct. 28, 2016, which is a continuation of U.S. patent application Ser. No. 13/269,164, filed on Oct. 7, 2011. The entire contents of each of U.S. patent application Ser. No. 17/716,462, U.S. patent application Ser. No. 15/337,782 and U.S. patent application Ser. No. 13/269,164 are herein incorporated by reference for all purposes.

TECHNICAL FIELD

The embodiments herein relate to annotations of electronic files, and in particular to system and methods for facilitating annotations of electronic files in a distributed environment such as for webpages in a web-based e-learning system.

INTRODUCTION

Electronic learning (also called e-learning or eLearning) generally refers to education or learning where users engage in education related activities using computers and other computing devices. For examples, users may enroll or participate in a course or program of study offered by an educational institution (e.g. a college, university or grade school) through a web interface that is accessible over the Internet. Users may receive assignments electronically, participate in group work and projects by collaborating online, and be graded based on assignments and examinations that are submitted using an electronic drop box.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

To facilitate electronic learning, electronic files such as web pages are provided over a communication network, for example the Internet or a local area network (LAN). These electronic files may include various types of content such as course materials, learning tools, controls and administrative tools. A user of the e-learning system (e.g. a learner, an instructor, an administrator, etc.) is able to interact with the electronic files, for example via one or more servers providing the web pages.

In some circumstances, the user may desire assistance when interacting with the electronic files. For example, the user may not be familiar with the content and/or control options that are provided on a particular web page. In such cases, the user may want to seek assistance from another user or consult an instructional manual for the information that the user is seeking. However, instructional manuals or other assistance information may not specifically address a user's questions as the information contained therein is often prepared by another individual in advance of the user using the e-learning system. Furthermore, it may be difficult for a user to seek help from another user in real time, as other users may not be active on the system at the same time.

SUMMARY OF SOME EMBODIMENTS

According some embodiments, there is provided a computer-implemented annotation method having the steps of sending a first request for an electronic file to a remote processor, receiving the electronic file from the remote processor, defining at least one new annotation about the electronic file, defining at least one anchor associated with the at least one annotation, and storing the at least one annotation and the at least one anchor associated therewith in an annotation file that is different from the electronic file.

According to some other embodiments, there is provided a computer-implemented annotation method having the steps of receiving a first request for an electronic file from a client processor, sending the electronic file to the client processor, receiving at least one new annotation about the electronic file, receiving at least one anchor associated with the at least one annotation, and storing the at least one annotation and the anchor associated therewith in an annotation file that is different from the electronic file.

According to some other embodiments, there is provided an annotation system having at least one remote processor and at least one client processor in data communication with the at least one remote processor, the at least one client processor being adapted to send a first request for an electronic file to the at least one remote processor, receive the electronic file from the at least one remote processor, define at least one new annotation for the electronic file, and define at least one anchor associated with the at least one new annotation. At least one of the remote processor and the client processor is adapted to store the at least one least one annotation and the at least one anchor associated therewith in an annotation file that is separate from the electronic file.

BRIEF DESCRIPTION OF THE DRAWINGS

The drawings included herewith are for illustrating various examples of systems, methods and apparatus of the present specification and are not intended to limit the scope of what is taught in any way. In the drawings.

DETAILED DESCRIPTION OF VARIOUS EMBODIMENTS

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems and methods described herein may be implemented in hardware or software, or a combination of both. In some cases, embodiments may be implemented in computer programs executing on at least one programmable computing device comprising at least one processor, a data storage device (including in some cases volatile and non-volatile memory and/or data storage elements), at least one input device, and at least one output device.

Each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium, configured with a computer program, wherein the storage medium so configured causes a computer to operate in a specific and predefined manner to perform at least some of the functions described herein.

Some embodiments described herein relate systems and methods for annotating electronic files which allow users to create, store, and/or retrieve one or more annotations for one or more electronic files. For example, the user may insert user-customized annotations at one or more particular locations on a web page. The inserted annotations are then stored and may be made available for subsequent retrieval and display, in some cases by the same user, in some cases by other users.

In some cases these embodiments may permit a user to create self-authored user-generated help text, notes or other comments that can be made available when the user (or another user) subsequently revisits the web page. This may be particularly helpful in distributed environments where users may not be physically located at the same location and may not have the opportunity to easily ask each other for help, for example eLearning environments and other distributed environments. For example, a user may be able to "take-notes" on a particular webpage during orientation or a training session for the tools or controls provided on that webpage. These notes can then accessible to the user for review at a later time, such as when the user subsequently views that webpage to use some of those controls.

Furthermore, some embodiments described here may permit users to share annotations that are created by one or more users. For example, in an eLearning system a user (e.g. a learner) may have the option to select or retrieve annotations created other users, such as other fellow learners in the same virtual course (e.g. classmates), instructors, or administrative staff.

From the perspective of particular users (e.g. staff or instructors in an eLearning system), some embodiments described herein may allow them to address frequently asked questions and/or other topics of discussion by "pushing" annotations out to the users at appropriate locations in particular web pages. For example, if an instructor is receiving a number of questions with respect to a particular topic on a web page, the instructor may wish to create an annotation with an answer to that question, and then have the annotations be presented to the users who are viewing the topic on the web page. Similarly, technical staff (e.g. IT staff) may push out annotations to address technical questions that users may have, such as the use of particular controls on a web page.

In some embodiments, users may leave tips or hints in the form of annotations that may be displayed to another user who might have difficulty understanding some content on the web page. In some cases, the annotations may only be displayed to a user when the user had unsuccessfully attempted to respond to a particular question on the web page, for example when the user is taking a quiz.

Figure 1:
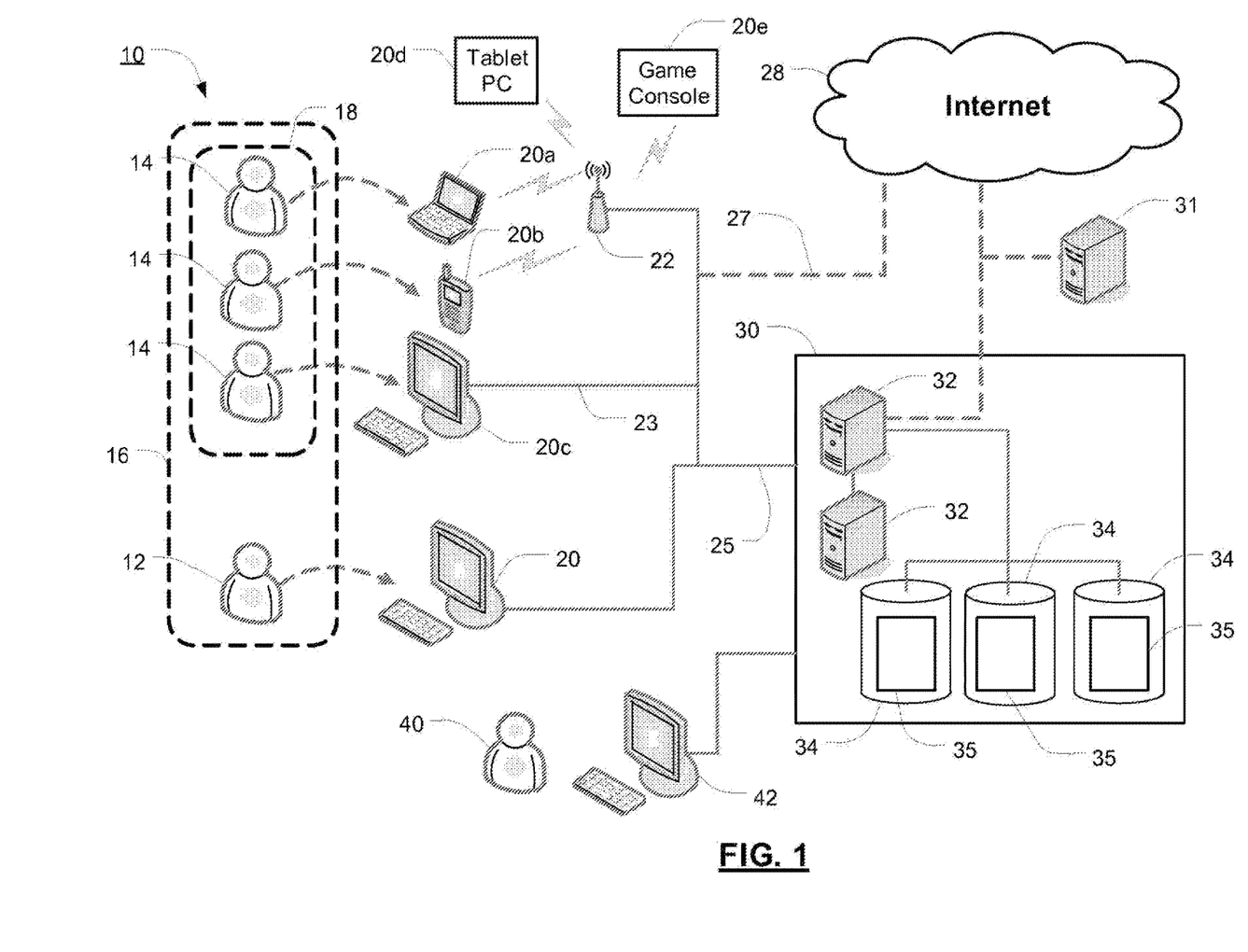
FIG. 1 is a schematic diagram of an eLearning system according to some embodiments.

Referring now to FIG. 1, illustrated therein is an educational system 10 for providing electronic learning or eLearning adapted for annotation of electronic files according to some embodiments. While some embodiments described herein are generally directed to eLearning systems, it should be understood that in other embodiments the systems and the methods described herein may be implemented outside of an eLearning environment.

Using the system 10, one or more users 12, 14 may communicate with an educational service provider 30 to participate in, create, and/or consume electronic learning services, including courses. In some cases, the educational service provider 30 may be part of, or associated with, a traditional "bricks and mortar" educational institution (e.g. a grade school, university or college), another entity that provides educational services (e.g. an online university, a company that specializes in offering training courses, or an organization that has a training department), or the educational service provider 30 may be an independent service provider (e.g. for providing individual electronic learning).

It should also be understood that a course may not be limited to formal courses offered by formal educational institutions. The course may include any form of learning instruction offered by an entity of any type. For example, the course may be a training seminar at a company for a group of employees or a professional certification program with a number of intended participants (e.g. PMP, CMA, etc.).

In some embodiments, one or more educational groups can be defined that includes one or more of the users 12, 14. For example, as shown in FIG. 1, the users 12, 14 may be grouped together in an educational group 16 representative of a particular course (e.g. History 101, French 254), with a first user 12 or "instructor" being responsible for providing the course (e.g. organizing lectures, preparing assignments, creating educational content etc.), while the other users 14 or "learners" are consumers of the course content (e.g. users 14 are enrolled in the course).

In some examples, the users 12, 14 may be associated with more than one educational group (e.g. the users 14 may be enrolled in more than one course, one user may be enrolled in one course and be responsible for teaching another course, and so on).

In some cases, educational sub-groups may also be formed. For example, the users 14 may be part of educational sub-group 18. The sub-group 18 may be formed in relation to a particular project or assignment (e.g. sub-group 18 may be a lab group) or based on other criteria. In some embodiments, due to the nature of the electronic learning, the users 14 in a particular sub-group 18 need not physically meet, but may collaborate together using various tools provided by the educational service provider 30.

In some embodiments, other groups 16 and sub-groups 18 could be defined using other contexts. For example, a group could include users 14 that share common interests (e.g. in a particular sport), that participate in common activities (e.g. members of a choir or a club), and/or have similar attributes (e.g. users that are male, users under twenty-one years of age, etc.).

Communication between the users 12, 14 and the educational service provider 30 can occur either directly or indirectly using any suitable computing devices. For example, the user 12 may use a computing device 20 having one or more client processors, such as a desktop computer that has at least one input device (e.g. a keyboard and a mouse) and at least one output device (e.g. a display screen and speakers).

The computing device 20 can generally be any suitable device for facilitating communication between the users 12, 14 and the educational service provider 30. For example, the computing device 20 could be a laptop 20*a* wirelessly coupled to an access point 22 (e.g. a wireless router, a cellular communications tower, etc.), a wirelessly enabled personal data assistant (PDA) 20*b* or smart phone, a terminal 20*c*, a tablet computer 20*d*, a game console 20*e* over a wired connection 23, and so on.

The computing devices 20 may be connected to the service provider 30 via any suitable communications channel. For example, the computing devices 20 may communicate to the educational service provider 30 over a local area network (LAN) or intranet, or using an external network (e.g. by using a browser on the computing device 20 to browse to one or more web pages (electronic files) presented over the Internet 28 over a data connection 27).

In some examples, one or more of the users 12, 14 may be required to authenticate their identities in order to communicate with the educational service provider 30. For example, the users 12, 14 may be required to input a login name and/or a password or otherwise identify themselves and gain access to the system 10.

In some examples, one or more users (e.g. "guest" users) may be able to access the system 10 without authentication. Such guest users may be provided with limited access within the system 10, such as the ability to review one or more components of the course, for example to decide whether they would like to participate in the course, but without the ability to participate in class discussions, and so on.

In some embodiments, the wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one user 14 may use a laptop 20*a* to browse to a webpage that displays elements of an electronic learning system (e.g. a course page).

The educational service provider 30 may include a number of functional components for facilitating the provision of electronic learning services. For example, the educational service provider 30 generally includes one or more processing devices such as servers 32, each having one or more processors. The processors on the servers 32 will be referred to generally as "remote processors" so as to distinguish them from client processors found in computing devices 20, 20*a*-20*e*.

The remote processors on the servers 32 are configured to send information (e.g. electronic files such as web pages) to be displayed on the computing devices 20 in association with the electronic learning system 10.

The educational service provider 30 also generally includes one or more data storage devices 34 (e.g. memory, etc.) that are in communication with the servers 32. The data storage devices 34 could include relational databases (such as a SQL database), or other suitable data storage devices. The data storage devices 34 are configured to host data 35 about the courses offered by the service provider, for example the course frameworks, educational materials to be consumed by the users 14, records of assessments done by users 14, and so on. As described below, the data storage devices 34 may also include annotation information to be presented when particular electronic filed are presented to a user.

The data storage devices 34 may also store authorization criteria that define what actions may be taken by the users 12, 14. In some embodiments, the authorization criteria may include at least one security profile associated with at least one role. For example, one role could be defined for users who are primarily responsible for developing an educational course, teaching that course, and assessing work product from other users for that course. Users with such a role may have a security profile that allows them to configure various components of the course, post assignments, add assessments, evaluate the performance of other users, and so on.

In some embodiments, some of the authorization criteria may be defined by specific users 40 (e.g. administrators) who may or may not be part of the educational community 16. For example, users 40 may be permitted to administer and/or define global configuration profiles for the system 10, define roles within the system 10, set security profiles associated with the roles, and assign the roles to particular users 12, 14 in the system 10. In some cases, the users 40 may use another computing device (e.g. a desktop computer 42) to accomplish these tasks.

The data storage devices 34 may also be configured to store other information, such as personal information about the users 12, 14 of the system 10, information about which courses the users 14 are enrolled in, roles to which the users 12, 14 are assigned, particular interests of the users 12, 14 and so on.

The servers 32 and data storage devices 34 may also provide other electronic learning management tools (e.g. allowing users to add and drop courses, communicate with other users using chat software, etc.), and/or may be in communication with one or more other vendors that provide the tools.

In some embodiments, the system 10 may also have one or more backup servers 31 that may duplicate some or all of the data 35 stored on the data storage devices 34. The backup servers 31 may be desirable for disaster recovery (e.g. to prevent undesired data loss in the event of an event such as a fire, flooding, or theft).

In some embodiments, the backup servers 31 may be directly connected to the educational service provider 30 and located within the system 10 at a different physical location. For example, the backup servers 31 could be located at a remote storage location at a distance from the service provider 30.

Generally, servers 32 and data storage devices 34 store electronic files that are to be provided to the computing devices 20 for consumption by the users 14. In an eLearning environment example, the electronic files may be web pages that contain learning material such as course content, quizzes, discussion boards or any other content that facilitate the eLearning process. In other examples the electronic files may be other types of files or have other types of content.

Figure 2:
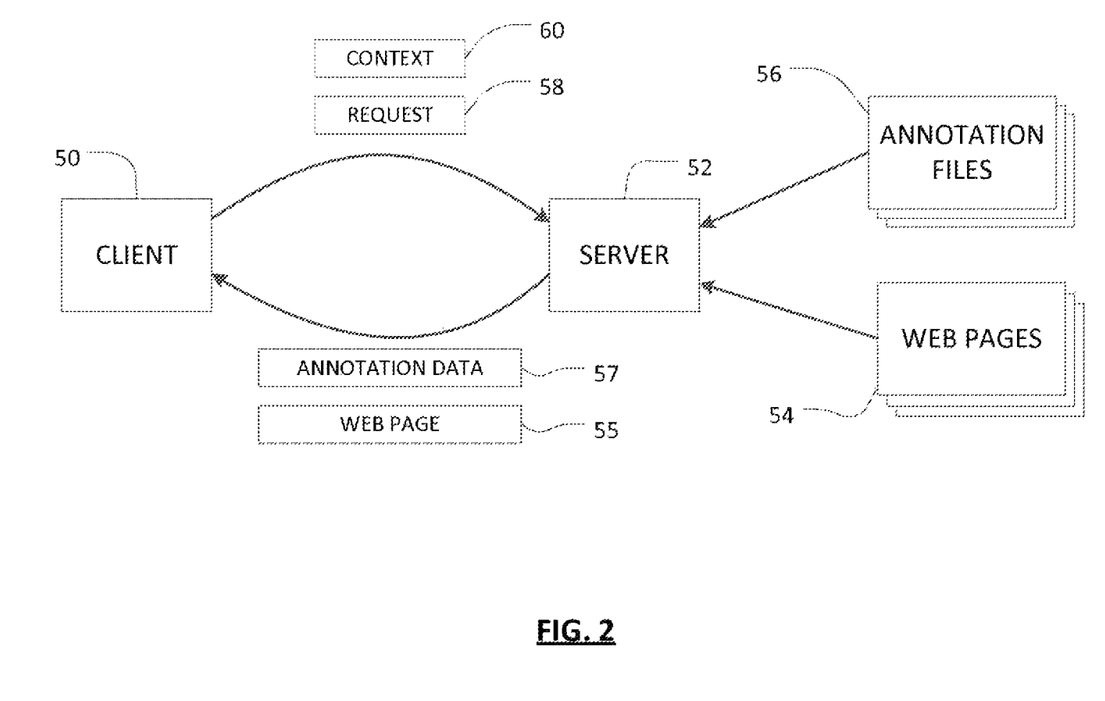
FIG. 2 is a schematic diagram of an exemplary interaction between the client computers and the servers of the eLearning system shown in FIG. 1.

Referring now to FIG. 2, illustrated therein is an exemplary embodiment of client-server interactions between the servers 32 and the computing devices 20 in the eLearning system 10. For ease of illustration, the servers 32 from the system 10 of FIG. 1 are represented by a single server 52 and the client computing devices 20-20e from the system of FIG. 1 are represented by a single client computer 50, although it will be understood that multiple servers 52 and client computers 50 may be used.

As shown, the server 52 has access to web pages 54 and annotation files 56, which may be stored for example in the data storage device 34. To access a web page located on the server 52, the client computer 50 transmits a request 58 and context information 60 to the server 52 as shown. The request 58 may include information that is at least partially necessary to identify the particular web pages 54 that the client computer 50 is requesting. For example, the request 58 may include URL information of the web page.

The context information 60 generally contains information about the circumstances surrounding or associated with the request 58. For example, context information 60 may include information about previous activity associated with the client computer 50, an account identifier associated with one of the users 12, 14 who is making the request 58 using the client computer 50, or other information. Generally, when the context information 60 is combined with the request 58, the server 52 can identify the particular web page 55 that client computer 50 is requesting.

In some examples the context information 60 may also include information pertaining to the display of web pages on the client computer 50. For example, if there are multiple web pages 54 that are being requested by the client computer 50, the context information 60 may include instructions relating to how each particular web page should be displayed in relation to other web pages.

In some embodiments, the context information 60 may be stored in a file (e.g. a cookie) associated with a web browser application on the client computer 50. In some examples, the client computer 50 may provide the context information 60 to the server 52 without receiving a specific request therefor from the server 52. In effect, the client computer 50 can voluntarily supply the context information 60.

In other examples, the client computer 50 may initially only send the request 58; the server 52 may then request the context information 60 and the client computer 50 may subsequently provide the context information 60 in response.

In some cases, the context information 60 may not be required to identify a specific web page that the client 50 is requesting. For example, if a guest user is requesting a root or a home page of an eLearning website, then it may not necessary to provide the context 60 to identify the particular web page of interest.

Upon receipt of the request 58 and the context information 60, the server 52 attempts to fill the request 58 by locating the particular web page 55 that the client 50 requested. In some cases, the web page 55 is located based on the URL information and the context information 60. In addition, in some instances the server 52 may dynamically modify or format the web page 55 based on the context information 60, or based on other information known to the server 52.

The web page 55 is then transmitted to the client 50. The server 52 may also determine whether there are any annotation data that are associated with the web page 55 and the context information 60. In the example shown, annotation data 57 is associated with the given web page 55 and context information 60 and the annotation data 57 is provided to the client 50. In some embodiments, the annotation data 57 may have been previously generated by the same user or other users.

The annotation data 57 may be selected from one or more annotation files 56 stored in the data storage device 34. The annotation data 57 generally includes data associated with annotations and anchors on the particular web page 55. For example, the web page 55 may be a web page 70 that includes annotations as shown in FIG. 3 and described below.

Figure 3:
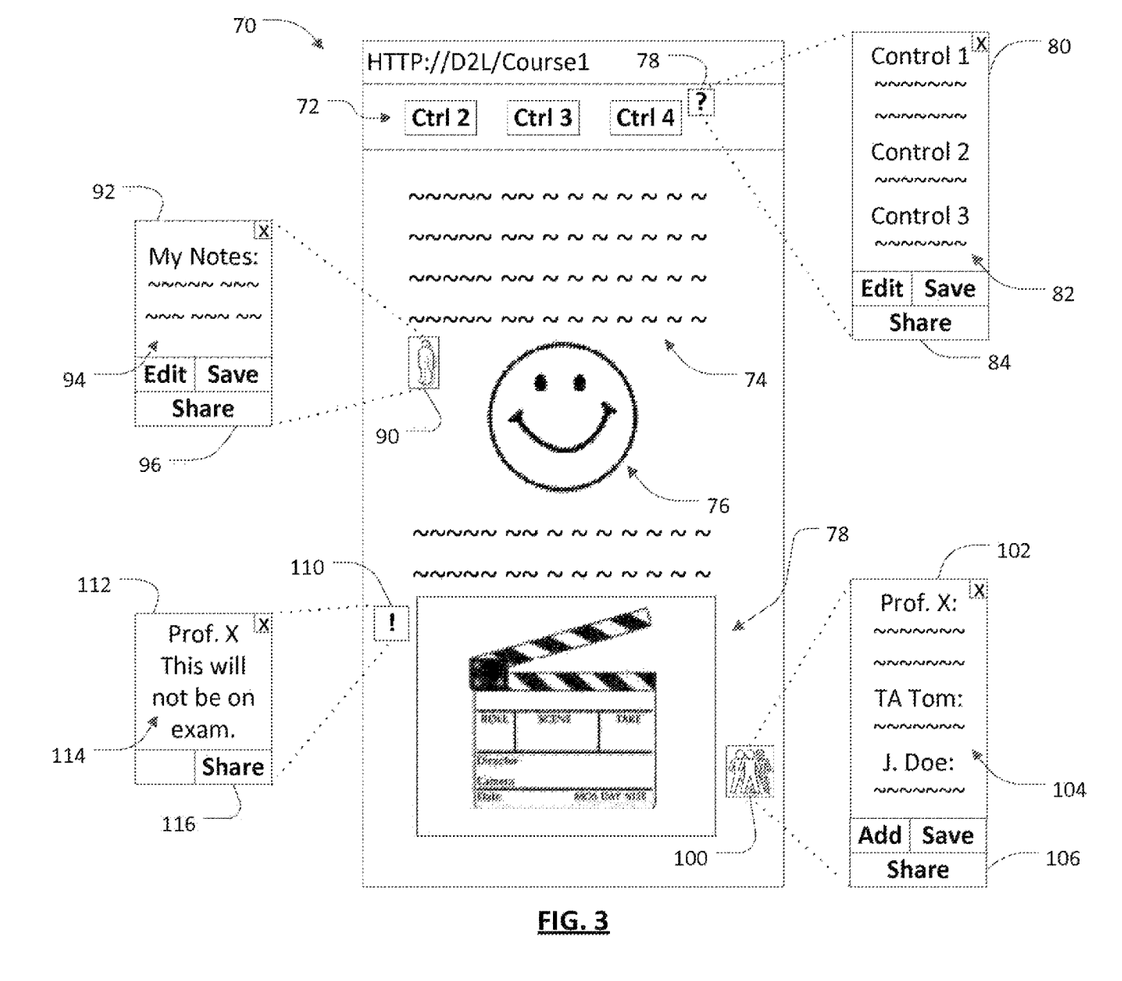
FIG. 3 is a schematic diagram of an exemplary web page provided by the servers of FIG. 2.

Referring now to FIG. 3, illustrated therein is an exemplary web page 70 that may be provided by the server 52 in response to a request 58. For example, the web page 70 may correspond to the web page 55 shown in FIG. 2.

The web page 70 may include control tools 72, text content 74, image content 76, video content 78, and other elements.

The control tools 72 may allow the user to interact with the particular web page 70 or more generally with the server 52, and could include for example radio buttons, check boxes, buttons, drop down lists, and so on. In some cases, these control tools 72 may be added to the electronic document based on the context information 60. In some cases, similar control tools 72 may also be added to other web pages.

The text content 74, image content 76, video content 78 may include course specific content, such as study materials for a user, or other suitable content.

The web page 70 also includes a user-generated annotation indicator 90. The indicator 90 may be interacted with (e.g. by having a pointing device pointing at it or by clicking on it) to allow the user to add, modify, or review annotation information associated with the indicator 90. For example, as shown, an annotation object 92 is displayed when the indicator is interacted with. The annotation object 92 allows the user to input annotation information 94 associated with the indicator 90. The annotation information 94 can then be saved for future reference (e.g. in the data storage device 34). The annotation information 94 may be of various formats, and for example could include text, images, videos, links, and so on.

In some embodiments, the annotation object 92 may include various sharing options 96 to permit dissemination of the annotation information 94 to other users of the system 10. For example, the annotation information 94 may be shared with other classmates, a specified group of users (e.g. friends), instructors, administrators, to a discussion board, and so on.

When the annotation information 94 is shared, the annotation information 94 may be provided to another user. For example, when a second user requests the same web page 70, that user may be provided with a visual cue (e.g. a community annotation indicator 100) indicative of the existence of shared annotation information 94. In another example, the recipient may be alerted of the shared information via a form of electronic communication, such as a popup message, an email, and so on.

In some embodiments, the annotation indicator 90 is associated with an anchor 91. The anchor 91 is defined by the user and is indicative of the location of an annotation object 92 on the web page 70. For example, the user 12 or 14 may select a point on the web page to add the indicator 90. That is, the user may define an anchor 91 for the location of the annotation indicator 90.

Generally, the anchor 91 may be defined by the user when the user selects a specific location on the web page 70 to add annotation information thereto. In some embodiments, the anchor 91 may be associated with a location on the web page 70. For example, the anchor 91 may also be associated with a raster coordinate in the web page.

In some embodiments, the anchor 91 may be associated with various content objects on the web page such as a text box, a control button, an image, a video frame, an iFrame, etc. In such cases, the anchor is associated with that content object such that the associated annotation is provided each time the content object. That is, if the content object (and the anchor) is provided as part of one or more other webpages, the annotation associated with the content object will also be provided. The association between the anchor 91 and a content object could be based on user input or be automated, for example based upon the proximity of the annotation object 92 to the anchor 91. In some embodiments, Generally, it may be desirable to associate the anchor 91 with one or more of the content objects so that the location of annotations in subsequent renderings the web pages tend to be more uniform. That is, if the annotation is semantically associated with a content object, then it may be desirable for the annotation to display near that content object regardless of the location in the page on which the content object is rendered.

Furthermore, associating the anchor 91 with control objects may allow the annotation information associated therewith to be made available on each web page that the control objet is displayed on. For example, if the same control objects 72 with the annotation information are also displayed on other web pages, associating an anchor 91 with that control object 72 would permit the annotation information 94 associated therewith to be made available to other web pages displaying the same control object 72 (without having to recreate the user-generated annotation information 94) for each web page.

It should be noted that the annotation indicator 90 and annotation object 92 are generally defined by the user using the client computer 50. For example, the annotation indicator 90 and annotation object 92 may be generated by the user on a web page without any user-generated annotations. That is, the annotation indicator 90 and the annotation object 92 are not initially defined by the server 52, although in some embodiments they may be stored in the data storage device 34 by the server 52 after being defined. In this manner the annotation indicator 90 and annotation objects 92 can be contrasted to pre-generated annotation information (e.g. as usually provided as part of a help file) which is normally generated by a server or defined in advance and provided as part of a web page or software application, for example.

In some embodiments, after being defined the user-generated annotation information 94 and the anchor 91 are provided to the server 52 such that they may be stored and made available when the web page 70 is subsequently requested. In some embodiments, the user-generated annotation information 94 is stored locally on the client computer 50. For example, a browser plug-in application may be used to store and retrieve such locally stored annotation information 94 on the client computer 50.

In other embodiments the annotation information 94 is stored on the server 52 such that this information may be made available to that user (or another user) regardless of which particular computing device 20 is used to access the web page 70.

Also illustrated in FIG. 3 is a help indicator 78. The user may interact with the help indicator 78 (e.g. by having a pointing device pointing at it or by clicking on it) to display additional help information 82, as shown in a help object 80 having help information 82.

In contrast to the annotation object 90, the help object 80 is generally pre-generated. That is, the help information 82 is normally authored at an earlier time, for example by a programmer of the control tools 72. The location of the help object 80 is normally also predetermined.

In the embodiment shown, the help object 80 may allow the user to edit the existing help information 82. In other embodiments, the help text box may allow the user to add to (but not remove) the existing information 82. If the help information 82 is edited, in some embodiments the edited information may be stored so that it can be subsequently made available on the web page 70.

The help object 80 may also include various sharing options 84 to permit dissemination of the user edited information 83 to others. These sharing options 84 may be similar to the sharing options 96 provided in the annotation object 90.

Also shown in FIG. 3 is a community annotation indicator 100. The community annotation indicator 100 is similar to the annotation indicator 90 in that it provides a visual cue of the existence of additional information. The community annotation indicator 100 (when interacted with) may display additional community annotation information 104, for example using in a community annotation object 102. In some embodiments, this annotation object 102 may also be shared using the sharing option 106.

In some embodiments, the community annotation information 104 may include various information provided by other users of the system 10, and which may be customizable based on user preferences. For example, a user may provide preference information as to whose annotations should be displayed first, or if a particular users annotations should be displayed at all. For example the user may choose to display annotations for instructors first, followed by annotations from trusted friends, followed by classmates in the same class, followed by other members of the general eLearning community.

In some embodiments, the display of the community annotation information 104 could be customized based on reputation, grades, level of permission, and other suitable factors.

In some embodiments, the community annotation information 104 from members of various groups could be displayed using various colors or other patterns associated with each group so as to visually distinguish each group from the next.

In some circumstances, one of the users 12, 14 may wish to "push" certain information out to users who view the web page 70. For example, instructors may wish to address frequently asked questions and/or other topics of discussion by disseminating the information about that topic using instructor annotations located at relevant points on the web page 70. Illustrated in FIG. 3 is an important annotation indicator 110 (shown generally with an exclamation mark) with an important annotation object 112 displaying instructor-provided annotation information 114. This information may also be shared with other users using the sharing option 116.

In some embodiments, broadcasting or pushing of annotation information may not be limited to instructors. For instance, in some embodiments a super-user with access to super-user account identifiers (e.g. technical or administrative staff) may push annotation information out to one or more users.

In some embodiments, the same or similar features used to create a user-generated annotation may be used by a super-user to broadcast their user-generated annotation as important information 110. For example, if the user 12 is a super-user (e.g. through an account identifier provided in the context information 58 sent by the client computer 50 to the server 52) the web page 70 may provide an option to push that super-user's generated annotation information, for example, as part of the sharing options 96.

In other embodiments, annotations associated with the same content objects may be amalgamated so as to reduce the number of indicators that are displayed on a given web page. For example, if there are many different user annotation objects, community annotation objects and important annotation objects associated with one or more objects, one or more of these objects may be amalgamated with other annotation objects to reduce the number of overall objects or indicators displayed on the page.

Figure 4:
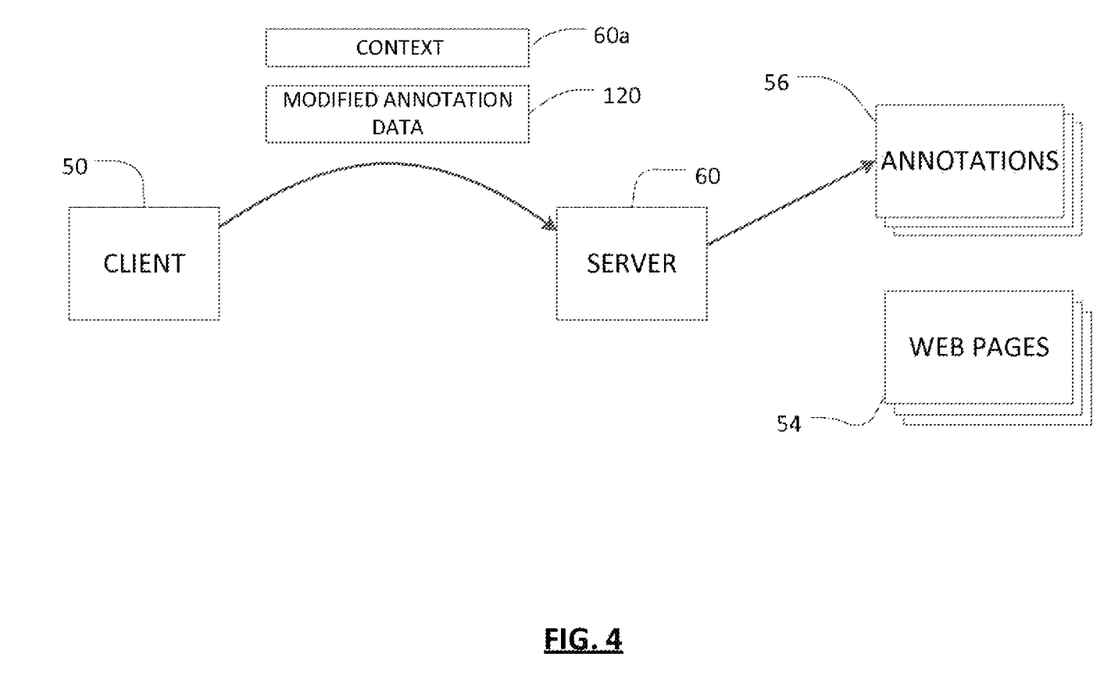
FIG. 4 is a schematic diagram of yet another exemplary interaction between client computers and servers shown in FIG. 2.

Referring now to FIG. 4, illustrated therein is another embodiment of an exemplary client-server interaction between the client 50 and the server 32. As shown, modified annotation data 120 and context 60a are transmitted to the server 52 for storage. The modified annotation data 120 may include information that may be needed to reproduce the annotations generated by the user. This may include, for example, user-generated annotation information 94 and the anchor 91. In cases where the user edits information in the help object 80 or a community object 92, such data may also be provided to the server 52.

In some embodiments, the modified annotation data 120 may also include annotation data 57 that was transmitted along with the web page 55 to the client computer 50. In some other embodiments, the modified annotation data 120 may include just the annotations implemented by the user on the given web page 70.

In some embodiments, the modified annotation data 120 may also include annotation metadata associated with the annotations generated by the user. For example, modified annotation metadata 120 may include an account identifier associated with the user that provided the user generated annotation. In another example, the modified annotation metadata may include general information about the web page 70 where the annotations were added, such as a course, topic, or content relating to the web page 70. The annotation metadata may be used to enable sharing and discovery purposes.

In some embodiments, the modified annotation data 120 may also include sharing options 96 selected by the user 12, 14. In some embodiments, the annotation data 120 may also include an account identifier associated with the one or more users 12, 14 that provided the particular annotations.

In some embodiments, the context 60a would generally include a URL address and other information that may be needed to uniquely identify the web page that the modified annotation data 120 corresponds to. This may, for example, include URL information, account identifier information, and other information similar to that of context information 60 described above.

Upon receipt of the annotation data 120 and the context 60a, the server 52 may store the modified annotation data 120 as part of annotation files 56. It should be noted that the modified annotation data 120 is stored in annotation files 56 that are separate from the web page 54 or the electronic files.

Furthermore, if the annotations are to be provided to other account identifiers (i.e. users), then corresponding annotation files may be modified such that the annotations are provided to the intended recipients when the recipients subsequently requests that web page 70.

Similarly, when the web page 70 is requested by the client computer 50, the web page 70 is provided to the client computer 50 along with the modified annotation data 120 such that the user is given access to the relevant annotations associated with the web page 70. That is, if there are any user-generated annotations, an annotation indicator may be displayed on the web page 70 based on the anchor associated therewith, and an annotation object containing the user-generated annotation object may then be displayed when the annotation indicator is interacted with. Similarly, the community annotations, help annotations, and important annotations as applicable may also be displayed.

In some embodiments, the contents 82, 94, 104, 114 of the annotation objects may not be automatically provided with the web page 70. For example, in some embodiments the contents 82, 94, 104, 114 of the annotation objects may be provided upon request, which could be triggered by interaction with the annotation indicators 80, 90, 100, 110.

Figure 5:
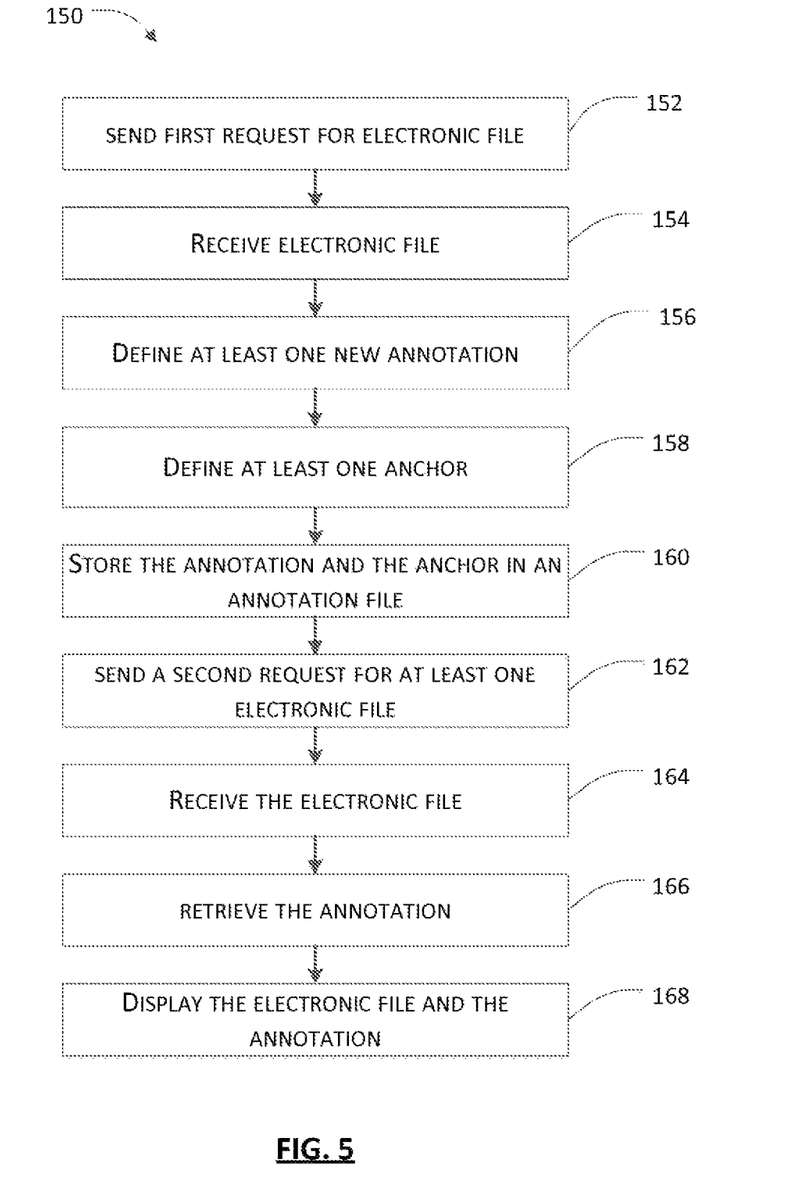
FIG. 5 is a computer implemented annotation method according to some embodiments.

Referring now to FIG. 5, illustrated therein is a computer-implemented annotation method 150 according to some embodiments. The method 150 may be executed by a computing device, such as the computing devices 20-20e or the client computer 50. The instructions to execute these steps on the processors of the computing devices may be in the form web pages or web requests.

At step 152, a request for an electronic file is sent to a remote processor. The electronic file may in some embodiments be a web page, such as the web page 70 as described herein above. The request may be similar to request 58 and the remote processor may be a processor on a server, such as the server 52.

At step 154, the electronic file is received from the remote processor.

At step 156, at least one new annotation is defined, for example by a user. The annotation may include annotation information such as annotation information 84, 94, 104, 114 as described above. It may also include an anchor such as the anchor 91. It may also include instructions on reproducing various annotation indicators and the annotation objects.

At step 158, at least one anchor associated with the at least one annotation is defined. The anchor is indicative of a location for the annotation. In some embodiments, the anchor may be a raster location on the web page and associated with the web page. In some embodiments, the anchor may be a content object, which may be on the web page.

At step 160, the at least one annotation and the at least one anchor associated therewith are stored in an annotation file that is separate from the electronic file. For example, the annotation may be stored locally in a file accessible a browser-extension plugin. In another example, the annotation (in some cases along with instructions for storing the annotation information) may be transmitted to the remote processor for storage at a remote data storage device.

At step 162, a second request for at least one electronic file having the anchor is sent to the remote processor. For example, the second request may be for the same electronic file provided in step 154. In another example, the second request may be for a different electronic file that has the same anchor (e.g. the content object associated with the anchor). This step may be executed in another session or at a subsequent time to the first request.

At step 164, the at least one electronic file requested for in step 162 is received from the remote processor in response to the second request.

At step 166, the at least one annotation associated with the anchor, which was stored in step 160 is retrieved. In some embodiments, where the annotation is stored remotely on the remote server, then the annotation may be received along with the electronic file and this step may involve locating the annotation in the received electronic file. In some embodiments where the annotations are stored locally in an annotation file, then this step may involve locating the relevant annotation associated with the electronic file.

At step 168, the electronic file, the anchor and the at least one annotation associated therewith are displayed. This may involve displaying the annotation indicator and when it is interacted with, displaying the annotation object and the annotation information.

Figure 6:
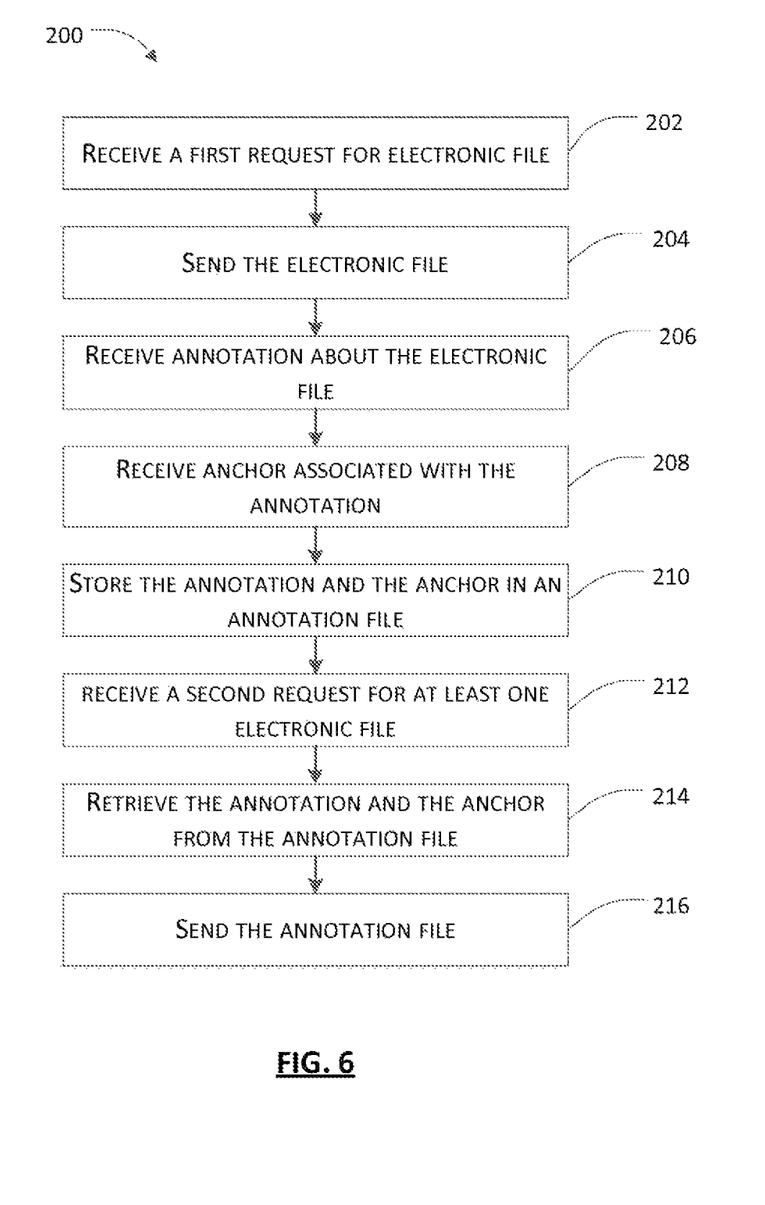
FIG. 6 is a computer implemented annotation method according to some embodiments.

Referring now to FIG. 6, illustrated therein is a computer-implemented annotation method 200 according to some other embodiments. The method 200 may be executed by server 50 to facilitate annotation of electronic files.

The method begins at step 202 where a first request for an electronic file is received from a client processor. The electronic file may be a web page as described above and the client processor may be a client processor located in the computing devices 20-203 or client computer 50. The first request may include context information and URL information necessary to identify the appropriate web page.

At step 204, the electronic file is transmitted to the client processor.

At step 206, the method comprises receiving at least one new annotation for the electronic file. The at least one new annotation may be similar to the annotation data 120 described herein above or the annotation as described in conjunction with step 150.

At step 208, at least one anchor associated with the annotation is received. The anchor is indicative of the location of the annotation. The anchor could be a location on the electronic file or a content object in the electronic file. For example, the at least one anchor may be the anchor 91 described herein above.

At step 210, the annotation and the anchor associated therewith is stored in an annotation file that is separate from the electronic file.

At step 212, a second request for at least one electronic file having the anchor is received from the client processor. The second request may include information necessary to identify the electronic file and the annotations associated therewith. For example, it may contain URL information about the webpage, relevant context, and an account identifier.

At step 214, the at least one annotation associated with the anchor is retrieved from the annotation file.

At step 216, the electronic file, the anchor and the at least one annotation associated therewith are sent to the client processor in response to the second request.

It should be understood that the systems and methods according some embodiments may be applied in distributed systems other than the eLearning environment.

In other words, while the above description provides examples of one or more apparatus, methods, or systems, it will be appreciated that other apparatus, methods, or systems may be within the scope of the present description as interpreted by one of skill in the art.

The invention claimed is:

1. A computer-implemented annotation method comprising:
sending a first request for a first electronic file to a remote processor;
receiving the first electronic file from the remote processor;
defining at least one new annotation about the first electronic file;
defining at least one anchor associated with the at least one annotation, the at least one anchor being indicative of the at least one annotation;
storing the at least one annotation and the at least one anchor in an annotation file that is different from the first electronic file;
sending a second request for a second electronic file that is different from the first electronic file;
receiving the second electronic file and a plurality of annotations and a plurality of anchors associated with the plurality of annotations, the plurality of annotations corresponding to annotations submitted by a plurality of users associated with a learning management system; and
displaying the second electronic file, including displaying at least one of the plurality of annotations according to at least one respective characteristic of the plurality of users corresponding to the plurality of annotations in relation to the learning management system
further comprising receiving an account identifier and associating the at least one annotation with the account identifier and wherein the at least one annotation received in response to the second request comprises a plurality of annotations that are associated with a plurality of account identifiers;
wherein the plurality of annotations received in response to the second request are ranked based on at least one heuristic criteria.

2. The method of claim 1, wherein the at least one anchor is associated with at least one of a location in the electronic file and a content object.

3. The method of claim 1, wherein the at least one annotation and the at least one anchor are transmitted to the remote processor and stored remotely and the at least one annotation is received from the remote processor in response to the second request.

4. The method of claim 1, wherein the at least one annotation and the at least one anchor are stored locally on the annotation file located in a client device and the at least one annotation and the at least one anchor are received locally from the annotation file.

5. The method of claim 1, further comprising receiving an account identifier and associating the at least one annotation with the account identifier.

6. The method of claim 1, further comprising generating annotation metadata associated with the annotation.

7. The method of claim 6, wherein the annotation metadata includes at least one of at least one account identifier associated with the annotation and contextual information about the electronic file associated with the annotation.

8. A computer-implemented annotation method comprising:
receiving a first request for a first electronic file from a client processor;
sending the first electronic file to the client processor;
receiving at least one new annotation about the first electronic file;
receiving at least one anchor associated with the at least one annotation;
storing the at least one annotation and the at least one anchor in an annotation file that is different from the first electronic file;

receiving a second request for a second electronic file that is different from the first electronic file;

sending the second electronic file to the client processor;

sending a plurality of annotations and a plurality of anchors to the client processor, the plurality of annotations corresponding to annotations submitted by a plurality of users associated with a learning management system; and displaying the second electronic file, including displaying at least one of the plurality of annotations according to at least one respective characteristic of the plurality of users corresponding to the plurality of annotations in relation to the learning management system, wherein the at least one annotation being sent to the at least one client processor includes a plurality of annotations associated with a plurality of account identifiers; and wherein the plurality of annotations received in response to the second request are ranked based on at least one heuristic criteria.

9. The method of claim 8, wherein the at least one anchor is associated with at least one of a location in the electronic file and a content object.

10. The method of claim 8, wherein the at least one annotation includes an account identifier associated therewith.

11. The method of claim 10, wherein the second request for the at least one electronic file includes the account identifier and the annotations are retrieved based at least partially upon the account identifier.

12. The method of claim 8, further comprising generating annotation metadata associated with the at least one annotation.

13. The method of claim 12, wherein the annotation metadata includes at least one of at least one account identifier associated with the at least one annotation and contextual information about the electronic file associated with the at least one annotation.

14. An annotation system comprising:

at least one remote processor; and at least one client processor in data communication with the at least one remote processor, the at least one client processor adapted to:

i. send a first request for a first electronic file to the remote processor, ii. receive the first electronic file from the remote processor, iii. define at least one new annotation about the first electronic file, iv. define at least one anchor associated with the at least one annotation, the at least one anchor being indicative of the at least one annotation, v. send a second request for a second electronic file to the remote processor, vi. receive the second electronic file from the remote processor, and vii. receive a plurality of annotations and a plurality of anchors from the remote processor, the plurality of annotations corresponding to annotations submitted by a plurality of users associated with a learning management system, wherein at least one of the remote processor and the client processor is adapted to store the at least one annotation and the at least one anchor associated therewith in an annotation file that is separate from the electronic file; and wherein the remote processor is adapted to display the second electronic file, including at least one of the plurality of annotations according to at least one respective characteristic of the plurality of users corresponding to the plurality of annotations in relation to the learning management system;

wherein the at least one annotation sent to the at least one client processor comprises a plurality of annotations associated with a plurality of account identifiers, and wherein the annotations received are ranked based on a heuristic criteria.

15. The system of claim 14, wherein the at least one anchor is associated with at least one of a location in the electronic file and a content object.

16. The system of claim 14, wherein the at least one annotation includes an account identifier associated therewith.

17. The system of claim 14, wherein the second request for the electronic file includes the account identifier and the annotations are retrieved based at least partially upon the account identifier.

18. The system of claim 14, wherein at least one of the client processor and the remote processor is further adapted to generate annotation metadata associated with the at least one annotation.

19. The system of claim 18 wherein the annotation metadata includes at least one of at least one account identifier associated with the annotation and contextual information about the electronic file associated with the annotation.

\* \* \* \* \*